(12) United States Patent
Kimbara et al.

(10) Patent No.: US 7,484,521 B2
(45) Date of Patent: Feb. 3, 2009

(54) TANK SYSTEM INCLUDING MULTIPLE TANKS AND CONTROL METHOD THEREOF

(75) Inventors: Masahiko Kimbara, Okazaki (JP); Nobuyuki Ogami, Anjo (JP); Akira Yamashita, Toyota (JP); Nobuo Kobayashi, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 332 days.

(21) Appl. No.: 10/909,351

(22) Filed: Aug. 3, 2004

(65) Prior Publication Data
US 2005/0061371 A1 Mar. 24, 2005

(30) Foreign Application Priority Data
Aug. 7, 2003 (JP) ............................. 2003-288529

(51) Int. Cl.
*F17D 1/00* (2006.01)
(52) U.S. Cl. ...................... 137/14; 137/266; 137/487.5; 137/899
(58) Field of Classification Search ................... 137/14, 137/266, 486, 487.5, 899
See application file for complete search history.

(56) References Cited

U.S. PATENT DOCUMENTS

| | | | | |
|---|---|---|---|---|
| 3,690,115 A | * | 9/1972 | Clayton | 137/486 |
| 3,762,428 A | | 10/1973 | Beck et al. | |
| 4,394,871 A | * | 7/1983 | Czajka et al. | 137/487.5 |
| 5,454,408 A | | 10/1995 | DiBella et al. | |
| 6,831,564 B2 | * | 12/2004 | Bair, III et al. | 137/14 |
| 6,978,665 B2 | * | 12/2005 | Aoyagi et al. | 73/113 |
| 7,007,707 B2 | * | 3/2006 | Ambrosina et al. | 137/487.5 |

FOREIGN PATENT DOCUMENTS

| | | |
|---|---|---|
| DE | 14 98 361 A | 3/1969 |
| DE | 37 33 442 A1 | 4/1989 |
| DE | 199 40 834 A1 | 5/2000 |
| GB | 1105724 | 2/1966 |
| JP | A 2002-370550 | 12/2002 |
| WO | WO 01/38780 A1 | 5/2001 |

* cited by examiner

*Primary Examiner*—Kevin L Lee
(74) *Attorney, Agent, or Firm*—Oliff & Berridge, PLC

(57) ABSTRACT

A tank system of the invention with multiple tanks makes a joint flow of a fluid released from the multiple tanks and supplies the joint flow to a downstream device, which is located downstream of the multiple tanks. The tank system includes: primary pressure measurement modules that individually measure internal pressures of the multiple tanks as primary pressures; a secondary pressure measurement module that measures a pressure of the joint flow of the fluid as a secondary pressure; flow rate regulation modules that individually regulate release flow rates of the fluid to be released from the multiple tanks; and a pressure control module that estimates a supply flow rate to be supplied to the downstream device from the measured secondary pressure, and then sets an allocation of the supply flow rate of the fluid to be released from each of the multiple tanks corresponding to the measured primary pressure with regard to the tank. This arrangement ensures adequate regulation of the release flow rates from the multiple tanks.

19 Claims, 9 Drawing Sheets

TANK SYSTEM INCLUDING MULTIPLE TANKS AND CONTROL METHOD THEREOF

BACKGROUND OF THE INVENTION

1. Field of the Invention

The present invention relates to a tank system including multiple tanks and a control method of regulating release flow rates from the multiple tanks in the tank system.

2. Description of the Related Art

There is conventionally a tank system including multiple tanks for storing high-pressure gases. For example, in a fuel cell system that generates and outputs electric power through electrochemical reactions of hydrogen and oxygen, multiple high-pressure tanks are connected in series for storage of a large quantity of hydrogen gas. In the fuel cell system, the inherent structure of fuel cells requires reduction of the hydrogen gas flowing on the circuit to the low pressure. In a prior art structure, a pressure reducing valve is set in the vicinity of the mouth of each high-pressure tank to significantly reduce the pressure of the hydrogen gas, and the hydrogen gas of the reduced pressure is supplied to a downstream device located downstream of the high-pressure tanks (see, for example, Japanese Patent Laid-Open Gazette No. 2002-370550).

The fuel cell system of this arrangement requires high-pressure piping between the high-pressure tanks and the pressure reducing valves. The shortest possible high-pressure piping is desired on safety grounds. In one proposed structure, a pressure reducing valve is directly set at the mouth of each high-pressure tank to reduce the pressure of the hydrogen gas released from the mouth of the tank.

In this prior art system including multiple high-pressure tanks with pressure reducing valves, however, it is difficult to individually regulate the release flow rates of the hydrogen gas from the respective high-pressure tanks. This is ascribed to a little variation in setting of the secondary pressure among the pressure reducing valves located at the respective high-pressure tanks. The hydrogen gas is preferentially released from a high-pressure tank having a higher setting of the pressure reducing valve, among the multiple high-pressure tanks. The preferential release of the gas from only a particular tank having the higher setting of the pressure reducing valve causes uneven release rates (consumptions) and leads to an abrupt temperature change, which is disadvantageous for the strength of the tank structure.

SUMMARY OF THE INVENTION

The object of the invention is thus to eliminate the drawbacks of the prior art and to provide a tank system that ensures adequate regulation of release flow rates from multiple tanks, as well as a control method of such a tank system.

In order to attain at least part of the above and the other related objects, the present invention is directed to a tank system, which includes: multiple tanks; a conduit line that makes a joint flow of a fluid released from the multiple tanks and supplies the joint flow to a downstream device, which is located downstream of the multiple tanks; primary pressure measurement modules that individually measure internal pressures of the multiple tanks as primary pressures; a secondary pressure measurement module that measures a pressure of the joint flow of the fluid as a secondary pressure; flow rate regulation modules that individually regulate release flow rates of the fluid to be released from the multiple tanks; and a pressure control module that sets an allocation of a supply flow rate of the fluid to be released from each of the multiple tanks corresponding to the measured primary pressure with regard to the tank and the measured secondary pressure, and applies the flow rate regulation modules to attain the settings of the allocations of the supply flow rate and thereby control the secondary pressure.

There is a control method corresponding to the tank system of the invention discussed above. The present invention is thus also directed to a flow rate control method of a tank system having multiple tanks. Here the tank system makes a joint flow of a fluid released from the multiple tanks and supplies the joint flow to a downstream device, which is located downstream of the multiple tanks. The flow rate control method individually measures internal pressures of the multiple tanks as primary pressures, measures a pressure of the joint flow of the fluid as a secondary pressure, estimates a supply flow rate to be supplied to the downstream device from the measured secondary pressure, sets an allocation of the supply flow rate of the fluid to be released from each of the multiple tanks corresponding to the measured primary pressure with regard to the tank, and individually regulates release flow rates of the fluid to be released from the multiple tanks to attain the settings of the allocations of the supply flow rate and thereby control the secondary pressure.

The tank system and the corresponding control method of the invention estimate the supply flow rate as the total of the release flow rates from the respective tanks, based on the measured secondary pressure, and set the allocation of the supply flow rate of the fluid to be released from each of the multiple tanks corresponding to the measured primary pressure with regard to the tank. The tank system and the control method then release the fluid from the respective tanks at the settings of the allocations of the supply flow rate and thereby control the secondary pressure of the joint flow of the fluid supplied to the downstream device. This arrangement individually regulates the release flow rates from the multiple tanks and thereby ensures accurate control of the remaining quantities of the fluid in the respective tanks. For example, the fluid may preferentially be released from the tank having the higher remaining quantity (that is, the tank having the higher primary pressure). This equalizes the remaining quantities of the fluid in the respective tanks. The fluid may preferentially be released from any particular tank.

In one preferable application of the tank system of the invention, the pressure control module excludes at least one tank of lower primary pressure and selects remaining tanks as tanks of higher primary pressure, based on the measured primary pressures with regard to the multiple tanks. The pressure control module gives an instruction of releasing the fluid at preset flow rates to the flow rate regulation modules corresponding to the tanks of higher primary pressure. The selection of the tanks of higher primary pressure and the instruction are repeated at preset timings to successively change active tanks for the release of the fluid.

There is the control method corresponding to the tank system of this application. The control method of this application excludes at least one tank of lower primary pressure and selects remaining tanks as tanks of higher primary pressure, based on the measured primary pressures with regard to the multiple tanks. The control method then executes release of the fluid at preset flow rates from the tanks of higher primary pressure. The selection of the tanks of higher primary pressure and the execution of the release are repeated at preset timings to successively change active tanks for the release of the fluid.

The tank system and the corresponding control method of this application select the tanks of higher primary pressure, based on the measured primary pressures with regard to the multiple tanks, and execute release of the fluid at preset flow rates. The release of the fluid lowers the primary pressure in each of the selected tanks. The primary pressure in the selected tank eventually becomes lower than the primary pressure in the non-selected tank. The tanks of higher primary pressure are reselected at a preset timing. Such reselection successively changes the active tanks for the release of the fluid and ensures substantially even consumptions of the fluid from the respective tanks.

In another preferable application of the tank system of the invention, the pressure control module sequentially sets a higher allocation of the supply flow rate to a tank of higher primary pressure among the multiple tanks according to the measured primary pressures with regard to the multiple tanks, and instructs the flow rate regulation modules to release the fluid from the respective tanks at the settings of the allocations of the supply flow rate.

There is the control method corresponding to the tank system of this application. The control method of this application sequentially sets a higher allocation of the supply flow rate to a tank of higher primary pressure among the multiple tanks according to the measured primary pressures with regard to the multiple tanks, and executes release of the fluid from the respective tanks at the settings of the allocations of the supply flow rate.

The tank system and the corresponding control method of this application set the allocations of the supply flow rate corresponding to the observed primary pressures of the multiple tanks to the release flow rates from the respective tanks. Namely the greater amount of flow is released from the tank of the higher primary pressure, while the less amount of flow is released from the tank of the lower primary pressure. The tank of the higher primary pressure thus abruptly decreases the primary pressure, while the tank of the lower primary pressure gently decreases the primary pressure. This arrangement promptly reduces a variation in remaining quantity (primary pressure) among the multiple tanks and attains substantially even consumptions of the fluid from the respective tanks.

In one preferable embodiment of the tank system of the invention, each of the flow rate regulation modules is a solenoid valve that opens and closes a valve plug by means of electromagnetic force, and varies an open-close frequency of the valve plug to regulate the release flow rate. In the tank system of this embodiment, the open-close actions of the solenoid valve located in each tank are repeated in a preset time period. This regulates the flow rate per unit time. Adjustment of the open-close frequency of the valve plug varies the flow rate of the fluid supplied per unit time to the downstream of the tank and thereby controls the secondary pressure.

In another preferable embodiment of the tank system of the invention, each of the flow rate regulation modules is a needle valve that electrically moves back and forth a valve plug to adjust an opening sectional area, and varies an opening of the valve plug to regulate the release flow rate. In the tank system of this embodiment, the valve plug of the needle valve located in each tank is moved back and forth to vary the opening sectional area and thereby regulate the release flow rate. Namely adjustment of the opening of the valve plug regulates the flow rate of the fluid supplied to the downstream of the tank and thereby controls the secondary pressure. The needle valve is free from the problem of durability, which is observed in the direct-acting solenoid valve where contact and separation of the valve plug into and from the valve seat are frequently repeated.

In still another preferable embodiment of the tank system of the invention, each of the flow rate regulation modules is a motor-operated valve that includes: a motor as a driving source of a valve plug; a ball screw mechanism including a screw formed on an output shaft of the motor, a nut formed inside the valve plug, and balls interposed between the screw and nut; a guide that holds the valve plug to be linearly movable back and forth in an axial direction; and a spring that presses the valve plug in the axial direction to set the valve plug in a closed position in a power-off state of the motor. The flow rate regulation module converts a rotational motion of the motor into a linear motion of the valve plug and moves the valve plug back and forth to open and close a release flow path from the tank and thereby regulate the release flow rate.

In the tank system of this embodiment, the cooperation of the ball screw mechanism with the guide converts the rotational motion of the motor into the linear motion of the valve plug. The release flow rate from each tank is readily regulated by adjusting the electric current supplied to the motor. The back and forth motions of the valve plug are caused by the ball screw mechanism and the guide. This structure effectively reduces the abrasion and the friction. When the power supply to the motor is cut off, the valve plug is restored to its closed position by means of the pressing force of the spring. This arrangement effectively prevents leakage of the fluid out of the tank.

In another preferable application of the tank system of the invention, the pressure control module measures a time variation of the primary pressure with regard to each of the multiple tanks and sets the allocation of the supply flow rate of the fluid to be released from the tank, based on the measured time variation of the primary pressure and an inner volume of the tank. The tank system of this application estimates the flow volume released in a preset time period from the observed time variation of the primary pressure in each tank for the preset time period and the inner volume of the tank. This arrangement does not require flowmeters and thus desirably simplifies the structure of the tank system.

In another preferable embodiment of the invention, the tank system further has a flow rate measurement module that measures a release flow rate of the fluid released from each of the multiple tanks. The pressure control module sets the allocation of the supply flow rate of the fluid to be released from the tank, based on the measured release flow rate. The tank system of this application measures the release flow rate of the fluid from each tank and regulates the open-close actions of a valve located in each tank to make the observed release flow rate approach to a preset target level. This arrangement ensures easy regulation of the release flow rate of the fluid from each tank and controls the secondary pressure by taking into account the primary pressures (the remaining quantities of the fluid) of the respective tanks.

In the tank system of the invention, multiple tanks may be hydrogen tanks for storing hydrogen gas used for a fuel cell system mounted on a vehicle or may be compressed natural gas tanks for storing compressed natural gas used for an internal combustion engine system mounted on a vehicle.

These and other objects, features, aspects, and advantages of the present invention will become more apparent from the following detailed description of the preferred embodiments with the accompanying drawings.

DESCRIPTION OF THE PREFERRED EMBODIMENTS

Figure 1:
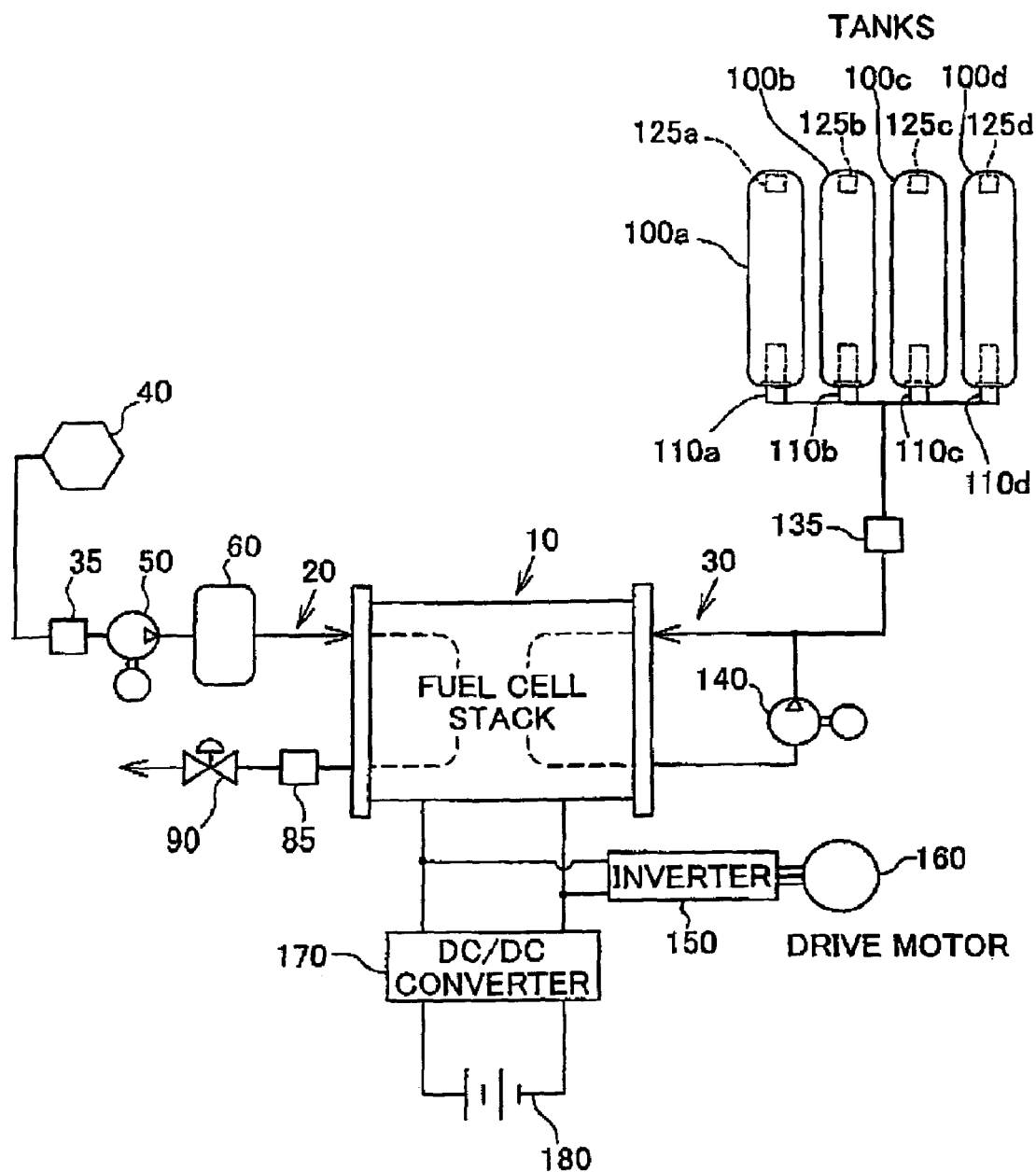
FIG. 1 schematically illustrates the configuration of a fuel cell system for the vehicle with a tank system of a first embodiment of the invention mounted thereon.

A fuel cell system with a tank system of the invention is discussed below as a preferred embodiment. FIG. 1 schematically illustrates the configuration of a fuel cell system for the vehicle with a tank system of a first embodiment of the invention mounted thereon. The fuel cell system generates electric power through electrochemical reactions of hydrogen with oxygen and uses the generated electric power for a power source of the vehicle. As shown in FIG. 1, the fuel cell system mainly includes a stack of fuel cells or fuel cell stack 10, an air line 20, and a fuel line 30.

The fuel cell stack 10 is manufactured as a laminate of multiple unit cells, each including a hydrogen electrode (anode) and an oxygen electrode (cathode). The unit cell has a separator, an anode, an electrolyte membrane, a cathode, and another separator laid one upon another in this sequence and generates electric power through electrochemical reactions of hydrogen included in a supply of a fuel gas and oxygen included in a supply of the air, which are respectively flown in grooves formed in the surface and the rear face of the separators. In this embodiment, the fuel cells are polymer electrolyte fuel cells including solid polymer membranes as electrolyte membranes, although other diverse fuel cells like phosphate fuel cells and alkali fuel cells may be used instead.

The air line 20 as a flow path of oxygen used for the electrochemical reactions includes a filter 40, a compressor 50, a humidifier 60, and piping that interconnects these elements. The intake air passing through the filter 40 is compressed by the compressor 50, is moistened with water content in the humidifier 60, and is fed to the cathodes of the fuel cell stack 10. The exhaust after the reactions in the fuel cell stack 10 is flown through an exhaust conduit located downstream of the fuel cell stack 10 and is discharged out. A pressure regulator 90 is located in the exhaust conduit. Adjustment of the aperture of the pressure regulator 90 generates a back pressure in the upstream of the pressure regulator 90 and thereby regulates the pressure of the air supplied to the fuel cell stack 10. A temperature sensor 35 located in the air line 20 measures a temperature T of the intake air passing through the filter 40, and a pressure sensor 85 measures a pressure P applied to the fuel cell stack 10. The measurement results T and P of the temperature sensor 35 and the pressure sensor 85 are output to a control unit 200 (discussed later).

The fuel line 30 as a flow path of hydrogen or fuel includes four high-pressure hydrogen tanks 100a, 100b, 100c, and 100d arranged in parallel, power-driven needle valves 110a, 110b, 110c, and 110d as flow controllers located at the mouths of the respective hydrogen tanks 100a, 100b, 100c, and 100d, and piping that interconnect these elements. The hydrogen gas stored in the high-pressure hydrogen tanks 100a, 100b, 100c, and 100d is reduced to low pressure by regulation of the release flow with the power-driven needle valves 110a, 110b, 110c, and 110d and is fed to the anodes of the fuel cell stack 10.

The hydrogen tanks 100a, 100b, 100c, and 100d have high internal pressure for storage of a large volume of hydrogen as the fuel. Pressure sensors 125a, 125b, 125c, and 125d located inside the hydrogen tanks 100a, 100b, 100c, and 100d measure respective internal pressures P1, P2, P3, and P4 of the hydrogen tanks 100a, 100b, 100c, and 100d. A pressure sensor 135 located downstream of the hydrogen tanks 100a, 100b, 100c, and 100d measures a circuit pressure Ps of the joint flow of hydrogen gas released from the respective hydrogen tanks 100a, 100b, 100c, and 100d. The measurement results of these pressure sensors 125a, 125b, 125c, 125d, and 135 are output to the control unit 200. The exhaust after the reactions in the fuel cell stack 10 includes remaining hydrogen gas, which has not been consumed by the reactions. The remaining hydrogen gas is circulated to the fuel line 30 by means of a hydrogen circulation pump 140. The structure of the power-driven needle valve 100 will be discussed later.

The electric power generated from the supplies of hydrogen and oxygen by the fuel cell stack 10 is output to an inverter 150 and is used to actuate a drive motor 160 of the vehicle. When the level of electric power required for driving the vehicle is less than the level of power generation, the surplus electric power is accumulated in an accumulator 180 via a DC/DC converter 170. In response to a demand of large electric power, for example, at the time of quick acceleration, the accumulator 180 supplements an insufficiency.

Figure 2:
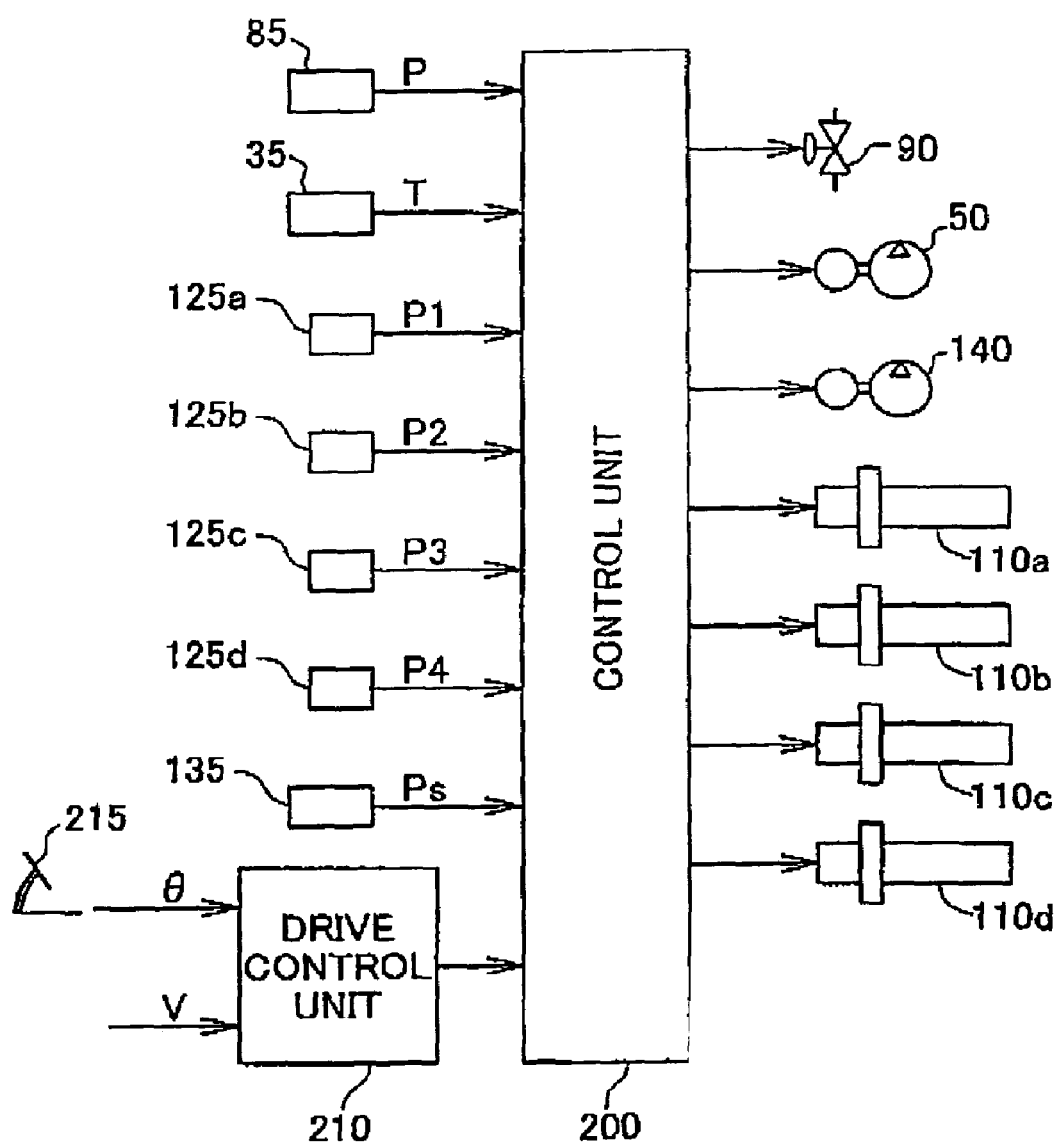
FIG. 2 shows input and output signals to and from a control unit included in the tank system of the first embodiment.

The fuel cell system has the control unit 200 to control actuators including various valves, motors, and pumps. FIG. 2 shows input and output signals to and from the control unit 200. The control unit 200 receives input signals from various sensors, specifies the current driving conditions of the fuel cell system, and outputs signals to control the actuators. The input signals include an accelerator opening θ from an accelerator position sensor 215 and a vehicle speed V from a vehicle speed sensor (not shown) via a drive control unit 210 that controls the operations of the vehicle, the pressure P from the pressure sensor 85, the temperature T from the temperature sensor 35, the internal pressures P1, P2, P3, and P4 from the pressure sensors 125a, 125b, 125c, and 125d located in the hydrogen tanks 100a, 100b, 100c, and 100d, and the circuit pressure Ps of the fuel line 30 from the pressure sensor 135. The control unit 200 computes output demands and controls the pressure regulator 90, the power-driven needle valves 110, the compressor 50, and the hydrogen circulation pump 140 to operate the fuel cell system. In the discussion below, when no specific discrimination is required, the multiple hydrogen tanks 100a through 100d, the multiple power-driven needle valves 110a through 110d, and the multiple pressure sensors 125a through 125d may be expressed generically as the hydrogen tank 100, the power-driven needle valve 110, and the pressure sensor 125.

In response to reception of a start command of the fuel cell system, the control unit 200 opens the power-driven needle valve 110 at the mouth of the hydrogen tank 100 and actuates the compressor 50 of the air line 20 to start supplies of the hydrogen gas and the air to the fuel cell stack 10. An increase in output enhances consumption of the hydrogen gas in the fuel cell stack 10 and lowers the pressure of the hydrogen gas. The pressure sensor 135 in the fuel line 30 detects the decrease in pressure of the hydrogen gas. The control unit 200 receives the detection result and controls the power-driven needle valve 110 to increase the flow rate of the supply of hydrogen gas. In response to reception of a stop command of the fuel cell system, on the other hand, the control unit 200 stops output of the control signals to the power-driven needle valve 110 and the compressor 50 to cut off the supplies of the hydrogen gas and the air. The control unit 200 regulates the flow rates of the supplies of the hydrogen gas and the air to manage the level of electric power required for driving the vehicle. The control unit 200 may estimate an increasing demand of the output electric power from the input accelerator opening θ and vehicle speed V and regulate the flow rate of the air supply and the power-driven needle valves 110.

Figure 3:
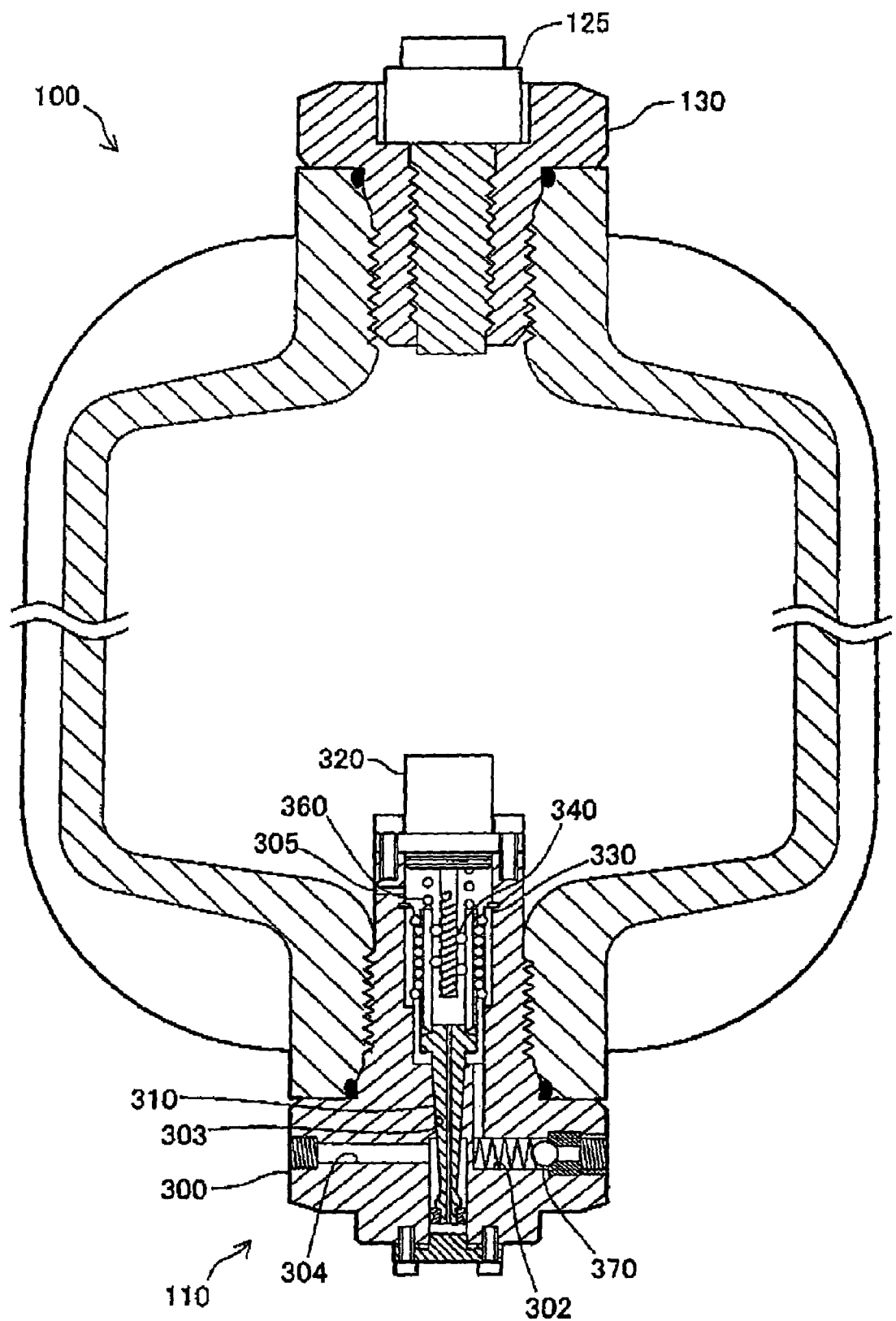
FIG. 3 is a sectional view schematically illustrating one hydrogen tank included in the tank system of the first embodiment.

In response to a command from the control unit 200, the power-driven needle valves 110a, 110b, 110c, and 100d used in the fuel cell system release the adequate flows of hydrogen gas from the corresponding hydrogen tanks 100a, 100b, 100c, and 100d to regulate the pressure of the flow of hydrogen gas supplied to the fuel cell stack 10. FIG. 3 is a sectional view schematically illustrating the hydrogen tank 100 in the tank system of this embodiment. As illustrated, the power-driven needle valve 110 is screwed into one mouth of the hydrogen tank 100, whereas a screw member 130 is screwed into the opposite mouth of the hydrogen tank 100. The power-driven needle valve 110 moves back and forth to regulate the flow of hydrogen gas released from the hydrogen tank 100. The pressure sensor 125 is set in the screw member 130 to measure the internal gas pressure of the hydrogen tank 100.

The power-driven needle valve 110 is a flow control valve mainly including a housing 300, a needle 310, a motor 320 that drives the needle 310, a ball screw mechanism 340 that converts the rotational motion of the motor 320 into linear motion of the needle 310, a linear guide 330 that holds the needle 310 to be movable back and forth, and a spring 360 that presses the needle 310 in a valve-closing direction. The back and forth movement of the needle 310 adjusts the opening sectional area of the flow path and thereby regulates the flow rate of the hydrogen gas from the hydrogen tank 100.

The housing 300 has an input port 302 that is used to fill the hydrogen tank 100 with the hydrogen gas, a tapered restriction flow path 303 that receives the needle 310 fit therein, and an output port 304 that is used to output the flow of hydrogen gas restricted by the needle 310. The input port 302 has a check mechanism 370 to prevent a reverse flow of the hydrogen gas out of the hydrogen tank 100. The hydrogen gas flown into the housing 300 via the check mechanism 370 and the input port 302 passes through an opening 305 formed on the side face of the housing 300 to fill the hydrogen tank 100.

The motor 320 is an AC servo motor and is powered on to regulate the rotational angle of its output shaft to a desired angle. The rotational angle of the output shaft is measured by a rotary encoder set inside the motor 320. The output shaft of the motor 320 has a male thread. The male thread formed on the output shaft, a mating female thread (nut) formed on the inner circumference of the shaft of the needle 310, and balls interposed between the male thread and the female thread constitute the ball screw mechanism 340. Rotation of the output shaft of the motor 320 moves back and forth the needle 310 via the ball screw mechanism 340.

Rail grooves are formed on the outer circumference of the shaft of the needle 310 to extend in the axial direction. Steel balls of the linear guide 330 set in the rail grooves prevent the needle 310 from rotating together with the output shaft of the motor 320. In the power-off state of the motor 320, the needle 310 closes the restriction flow path 303 by means of the resilience of the spring 360.

The motor 320 of the power-driven needle valve 110 located in each of the hydrogen tanks 100a, 100b, 100c, and 100d filled with the hydrogen gas is powered on to release the hydrogen gas from the hydrogen tank 100. The power supply moves the needle 310 to a predetermined position to make a gap (the restriction flow path 303) between the needle 310 and the housing 300 and release the flow of hydrogen gas via the output port 304.

The flows of hydrogen gas released from the respective hydrogen tanks 100a, 100b, 100c, and 100d by the power-driven needle valves 110 join together in a connection conduit and are supplied as a joint flow to the fuel cell stack 10. The pressure of the hydrogen gas supplied to the fuel cell stack 10 is controlled by regulating the flow rates of the hydrogen gas per unit time released from the four hydrogen tanks 100a, 100b, 100c, and 100d.

Figure 4:
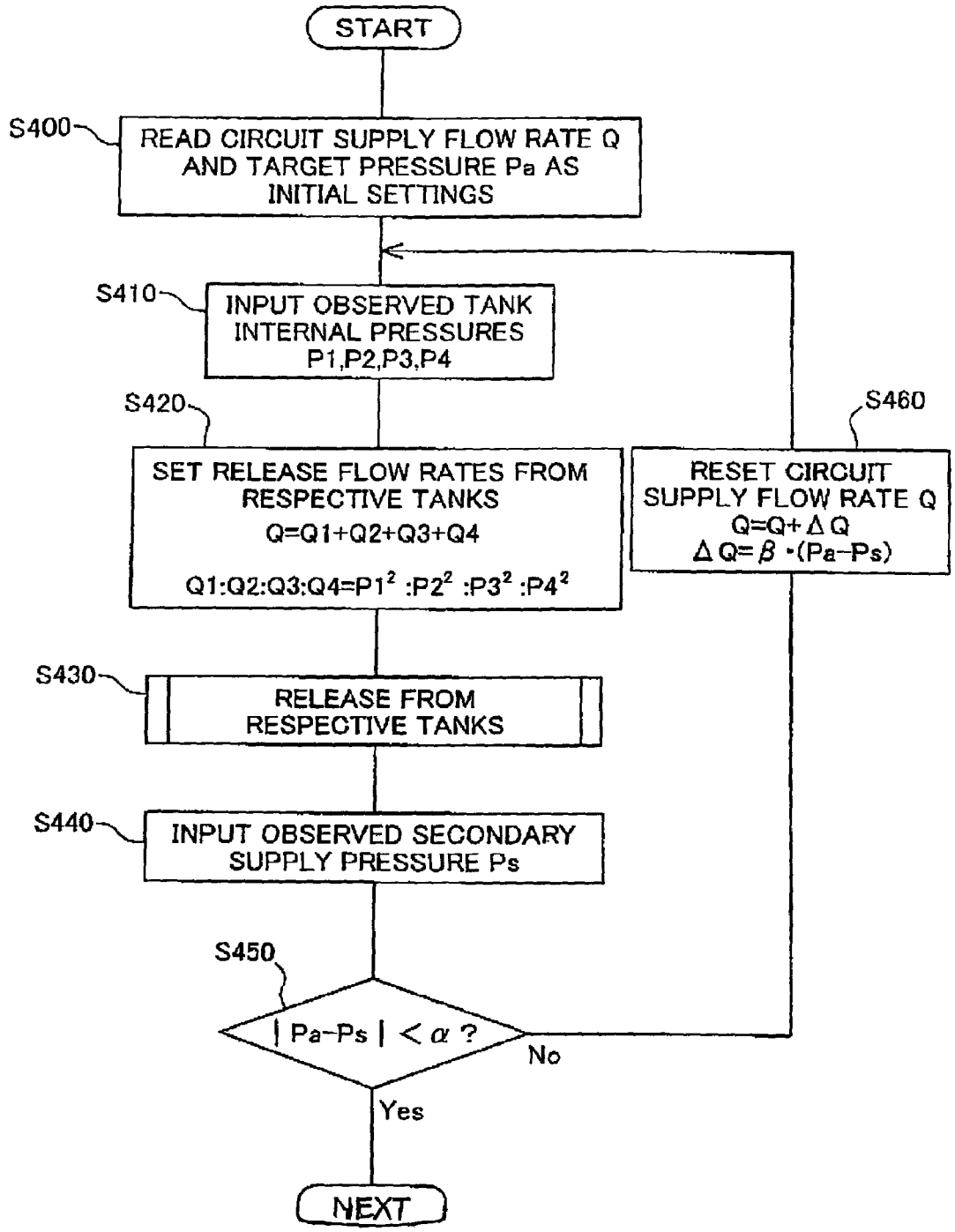
FIG. 4 is a flowchart showing a control routine of setting flow rates from respective hydrogen tanks and releasing hydrogen gas at settings of flow rates.

The flow rates of the hydrogen gas released from the respective hydrogen tanks 100a, 100b, 100c, and 100d are controlled according to the procedure discussed below. FIG. 4 is a flowchart showing a control routine of setting the flow rates of the hydrogen gas to be released from the respective hydrogen tanks 100a, 100b, 100c, and 100d based on the observed internal pressures of the respective hydrogen tanks 100a, 100b, 100c, and 100d and releasing the hydrogen gas to attain the settings of the flow rates. This control routine is executed by the control unit 200.

In response to reception of a start command of the fuel cell system sent from the drive control unit 210, the control unit 200 first reads a circuit supply flow rate Q and a target pressure Pa of the circuit as initial settings (step S400), and inputs the observed internal pressures P1, P2, P3, and P4 of the respective hydrogen tanks 100a, 100b, 100c, and 100d from the corresponding pressure sensors 125a, 125b, 125c, and 125d (step S410).

The control unit 200 computes release flow rates Q1, Q2, Q3, and Q4 of the hydrogen gas to be released from the respective hydrogen tanks 100a, 100b, 100c, and 100d from the input internal pressures P1, P2, P3, and P4 of the respective hydrogen tanks 100a, 100b, 100c, and 100d and the circuit supply flow rate Q as the initial setting (step S420). The computation process specifies a ratio to sequentially allocate the higher release flow rate to the hydrogen tank 100 having the higher observed internal pressure and sets the release flow rates Q1, Q2, Q3, and Q4 of the hydrogen gas to be released from the respective hydrogen tanks 100a, 100b, 100c, and 100d, in order to make the sum of the release flow rates equal to the input circuit supply flow rate Q. The procedure of this embodiment allocates the circuit supply flow rate Q to release the hydrogen gas from the respective hydrogen tanks 100a, 100b, 100c, and 100d at a ratio proportional to the squares of the observed tank internal pressures. One modified procedure may allocate the circuit supply flow rate Q to release the hydrogen gas at a ratio of the integral multiples of the observed tank internal pressures. Another modified procedure may use a map representing a stepwise variation in ratio against the observed tank internal pressures. This latter modified procedure attains the easy setting of the ratio by simply reading the ratio corresponding to the observed tank internal pressures from this map.

The control unit 200 releases the hydrogen gas from the respective hydrogen tanks 100a, 100b, 100c, and 100d at the settings of the release flow rates Q1, Q2, Q3, and Q4 (step S430). The release process sets values of electric current to be supplied to the power-driven needle valves 110a, 110b, 110c, and 110d of the respective hydrogen tanks 100a, 100b, 100c, and 100d and thereby regulates the opening sectional areas formed by the respective needles 310, which are moved in response to the settings of electric current.

The flow rate of the hydrogen gas released from each hydrogen tank 100 is estimated from the volume of the hydrogen tank 100 and the time variation of the tank internal pressure. A high release flow rate is expected from a large decrease in tank internal pressure per unit time, while a low release flow rate is expected from a small decrease in tank internal pressure per unit time. The release process supplies a preset level of electric current as an initial setting to the respective power-driven needle valves 110, measures time variations of the tank internal pressure in the respective hydrogen tanks 100, and successively varies the values of electric current to be supplied to the respective power-driven needle valves 110 according to the observed time variations of the tank internal pressure and the settings of the release flow rates Q1, Q2, Q3, and Q4. The procedure of this embodiment sets in advance the level of electric current as the initial setting to a predetermined flow rate. One modified procedure may prepare a map representing variations in electric current against the release flow rates Q1, Q2, Q3, and Q4 and the tank internal pressures and reads the values of electric current to be supplied to the respective power-driven needle valves 110a, 110b, 110c, and 110d from the map.

The flows of hydrogen gas released from the four hydrogen tanks 100a, 100b, 100c, and 100d according to the above release process join together and run downstream of the hydrogen tanks 100 to generate a supply pressure in the circuit. This downstream (secondary) supply pressure Ps is measured by the pressure sensor 135 on the circuit. The control unit 200 inputs the observed secondary supply pressure Ps (step S440).

The absolute difference between the secondary supply pressure Ps and the target pressure Pa is compared with a preset value α (step S450). The preset value α is a design value given as an allowable error. When the absolute difference is within the allowable error α at step S450, the routine goes to NEXT. This series of processing is repeated at preset timings.

When the absolute difference is out of the allowable error α at step S450, on the other hand, the control unit 200 resets the circuit supply flow rate Q, based on the absolute difference (step S460). This process increases or decreases the circuit supply flow rate Q read as the initial setting. When the secondary supply pressure Ps is greater than the target pressure Pa, the control process lowers the flow rates to be supplied from the respective hydrogen tanks 100a, 100b, 100c, and 100d. When the secondary supply pressure Ps is less than the target pressure Pa, on the other hand, the control process raises the flow rates to be supplied from the respective hydrogen tanks 100a, 100b, 100c, and 100d. A flow rate variation ΔQ is calculated as the product of the pressure difference (Pa−Ps) and a preset coefficient β. The routine then goes back to step S410 and repeats the above series of processing to compute the release flow rates of the respective hydrogen tanks 100 corresponding to the observed tank internal pressures from the reset circuit supply flow rate Q and release the hydrogen gas at the new settings of the release flow rates.

This control procedure regulates the release flow rates of the hydrogen gas from the respective hydrogen tanks 100a, 100b, 100c, and 100d, such that the higher release flow rate of the hydrogen gas is allocated to the tank of the higher internal pressure (that is, the tank having the greater volume of the hydrogen gas). The tank of the higher internal pressure has the higher release speed and the higher pressure reduction speed, compared with the tank of the lower internal pressure. The repeated execution of the above control routine at the preset timings successively varies the release flow rates from the respective hydrogen tanks 100a, 100b, 100c, and 100d and substantially eliminates the difference in internal pressure among these hydrogen tanks 100a, 100b, 100c, and 100d. This leads to substantially equal consumptions of the hydrogen gas from the respective hydrogen tanks 100a, 100b, 100c, and 100d. Even when multiple tanks have different tank internal pressures (primary pressures), the release control makes the primary pressures of the respective tanks approach to an identical level. The control procedure of this embodiment thus effectively prevents any preferential release from only one hydrogen tank 100 and its resulting abrupt temperature change.

The structure of this embodiment uses the power-driven needle valve 110 located at the mouth of the hydrogen tank 100. The direct-acting mechanism of the ball screw mechanism 340 and the linear guide 330, in combination with the motor 320, in the power-driven needle valve 110 varies the value of electric current and thereby regulates the position of the needle 310. This arrangement significantly facilitates the control of the release flow rate. This arrangement also remarkably reduces the frictional force produced by the motion of the needle 310, compared with conventional flow control valves. Even frequent back and forth motions of the valve thus hardly cause the problem of durability.

In the structure of the first embodiment, the four hydrogen tanks 100a, 100b, 100c, and 100d have an identical inner volume. When multiple tanks have different inner volumes, the release flow rates of the respective tanks are computed from both the ratio of the inner volume and the ratio of the tank internal pressure to equalize the inner pressures of the respective tanks (that is, the consumptions of the respective tanks). The release flow rates may alternatively be controlled to set preferential release from a selected hydrogen tank 100.

Figure 5:
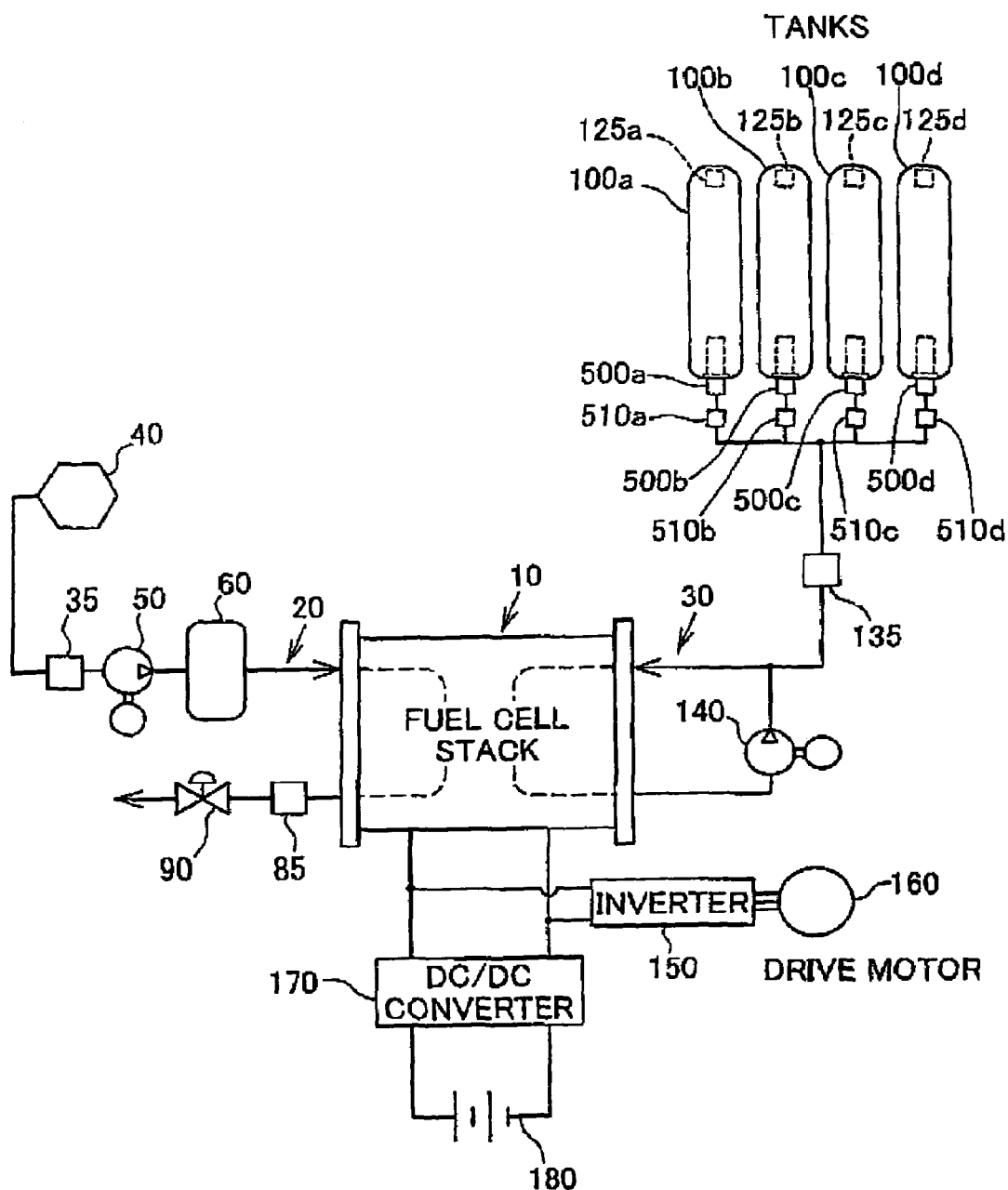
FIG. 5 schematically illustrates the configuration of another fuel cell system for the vehicle with a tank system of a second embodiment of the invention mounted thereon.

Another tank system and a corresponding control method are discussed below as a second embodiment of the invention. FIG. 5 schematically illustrates the configuration of another fuel cell system for the vehicle with the tank system of the second embodiment mounted thereon. As the primary differences from the tank system of the first embodiment, the tank system of the second embodiment uses solenoid valves 500a, 500b, 500c, and 500d for the flow control valves to control the release flow rates from the respective hydrogen tanks 100a, 100b, 100c, and 100d and has flowmeters 510a, 510b, 510c, and 510d located downstream of the respective hydrogen tanks 100a, 100b, 100c, and 100d to measure the release flow rates from the respective hydrogen tanks 100a, 100b, 100c, and 100d. The other constituents of the tank system of the second embodiment are similar to those of the tank system of the first embodiment and are thus not specifically described here. Like the hydrogen tanks, the solenoid valves 500a through 500d and the flowmeters 510a through 510d may generically be expressed as the solenoid valve 500 and the flowmeter 510.

As shown in FIG. 5, the tank system of the second embodiment has four hydrogen tanks 100a, 100b, 100c, and 100d. The flowmeter 510 is located in the vicinity of the mouth of each hydrogen tank 100. The flowmeter 510 is a Karman vortex flowmeter that takes advantages of the proportional relation of the flow velocity to the frequency of occurrence of the Karman vortex to measure the flow rate. The flowmeter 510 may be any of other diverse flowmeters including ultrasonic Doppler flowmeters and electromagnetic flowmeters. The measurement values of the flowmeters 510a, 510b, 510c, and 510d are output to the control unit 200 and are used for control of the release flow rates as discussed later.

The flow control valve set at the mouth of each hydrogen tank 100 is the solenoid valve 500 that excites a solenoid to move a valve plug back and forth and thereby open and close the flow path. The solenoid valve 500 is a normally-closed-type valve, which is initially closed by the pressing force of a spring and is opened by power supply to the solenoid.

Figure 6:
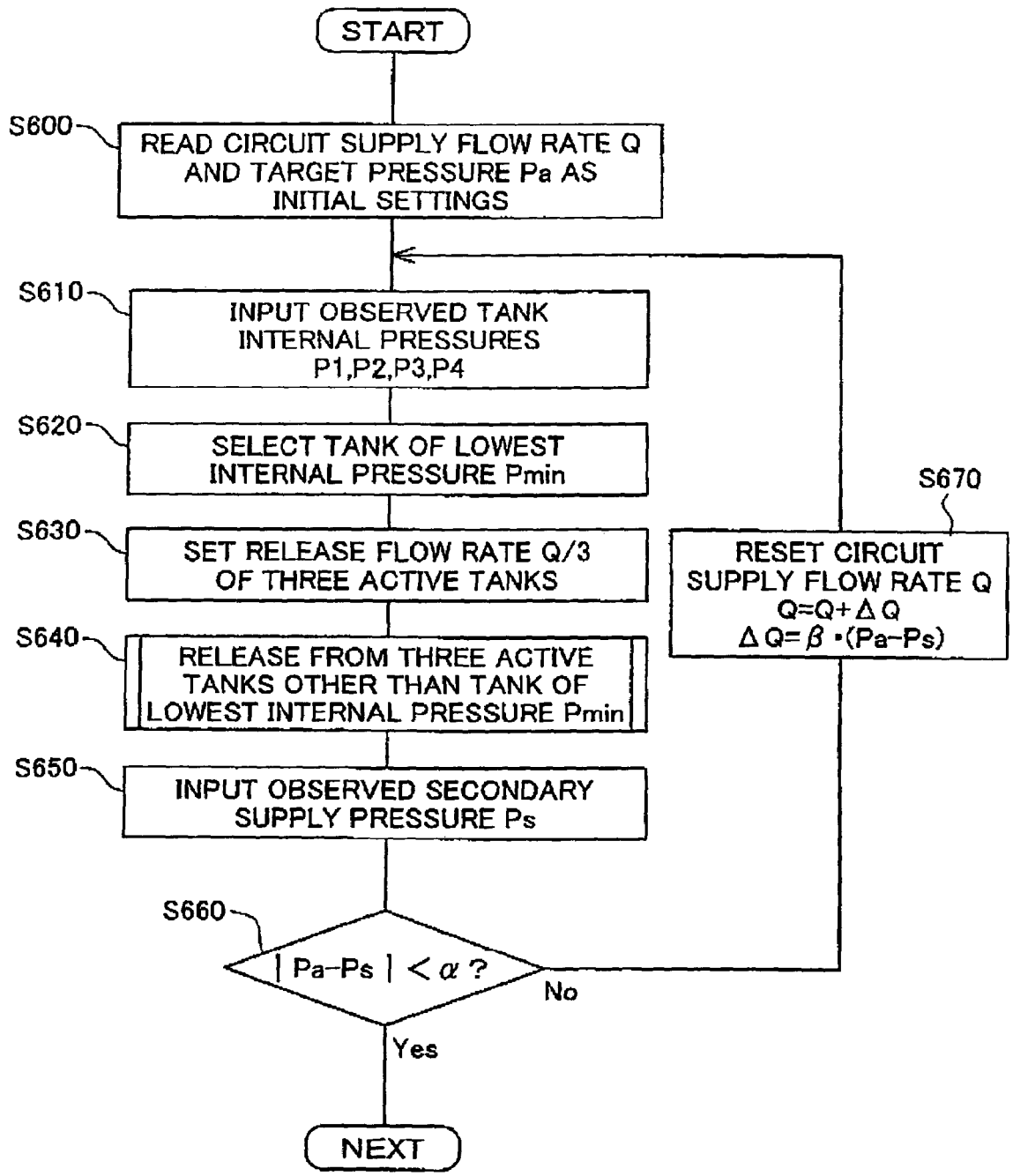
FIG. 6 is a flowchart showing a control routine of selecting active tanks for release and activating the selected tanks.

The flow rates of the hydrogen gas released from the respective hydrogen tanks 100a, 100b, 100c, and 100d are controlled according to the procedure discussed below. FIG. 6 is a flowchart showing a control routine of selecting active hydrogen tanks 100 for release corresponding to the internal pressures of the respective hydrogen tanks 100 and activating the selected hydrogen tanks 100. This control routine is executed by the control unit 200.

In response to reception of a start command of the fuel cell system sent from the drive control unit 210, the control unit 200 first reads a 15 circuit supply flow rate Q and a target pressure Pa of the circuit as initial settings (step S600), and inputs the observed internal pressures P1, P2, P3, and P4 of the respective hydrogen tanks 100a, 100b, 100c, and 100d from the corresponding pressure sensors 125a, 125b, 125c, and 125d (step S610). These steps are identical with steps S400 and S410 in the flowchart of FIG. 4 of the first embodiment.

The control unit 200 selects the hydrogen tank 100 of the lowest internal pressure Pmin among the input internal pressures P1, P2, P3, and P4 (step S620). It is assumed that the hydrogen tank 100 of the lowest internal pressure Pmin has the smallest remaining quantity of hydrogen gas. The control unit 200 thus activates the three hydrogen tanks 100 other than the hydrogen tank 100 of the lowest internal pressure Pmin to release the hydrogen gas. The release flow rate from each of the three hydrogen tanks 100 is set equal to ⅓ of the input circuit supply flow rate Q as a target flow rate (step S630).

The control unit 200 releases the hydrogen gas at the settings of the flow rates from the selected three hydrogen tanks 100 (step S640). This release process repeatedly turns the solenoid valve 500 ON and OFF to frequently open and close the valve plug and thereby regulate the release flow rate. The procedure of this embodiment inputs the measurement value from the flowmeter 510 located in the vicinity of the mouth of each hydrogen tank 100 and carries out feedback control to correct the valve open-close frequency according to the difference between the target flow rate Q/3 and the measurement value.

The flow volume released by one open-close action (hereafter referred to as one shot) of the solenoid valve 500 is substantially proportional to the tank internal pressure. The release flow rate is thus estimated from the number of shots per minute and the tank internal pressure. The release flow rate is regulated by varying the number of shots. For example, when the flow rate of hydrogen gas from one hydrogen tank 100 is less than the target flow rate Q/3, the number of shots is increased to make the release flow rate approach to the target flow rate Q/3.

Like the first embodiment, the release flow rate may otherwise be estimated from a variation of the tank internal pressure per unit time. Another modified procedure may use a map to determine the number of shots corresponding to the tank internal pressure and the target flow rate.

The equal volumes of hydrogen gas released from the three selected hydrogen tanks 100 join together and flow downstream of the hydrogen tanks 100 to generate the secondary supply pressure Ps. Like the control routine of the first embodiment, the control unit 200 inputs the observed secondary supply pressure Ps (step S650) and compares the absolute difference between the secondary supply pressure Ps and the target pressure Pa with the allowable error α (step S660). When the absolute difference is within the allowable error α at step S660, the routine goes to NEXT. This series of processing is repeated at preset timings. When the absolute difference is out of the allowable error α at step S660, on the other hand, the control unit 200 determines requirement for an increase or a decrease in pressure and resets the circuit supply flow rate Q (step S670). The number of shots of the solenoid valve 500 is varied according to the result of comparison between the target flow rate and the estimated release flow rate.

The control procedure of the second embodiment releases equal volumes of the hydrogen gas from the three selected hydrogen tanks 100 of the higher internal pressures among the four hydrogen tanks 100a through 100d. The release of the hydrogen gas lowers the internal pressure of the three active hydrogen tanks 100. When the internal pressure of the hydrogen tank 100 having the lowest internal pressure among the three active hydrogen tanks 100 becomes less than the internal pressure of the inactive hydrogen tank 100 that does not release the hydrogen gas, the active hydrogen tank 100 for release of the hydrogen gas is changed. Successive change of the active hydrogen tanks 100 for release of the hydrogen gas effectively reduces the difference in internal pressure among the respective hydrogen tanks 100a through 100d.

Figure 7:
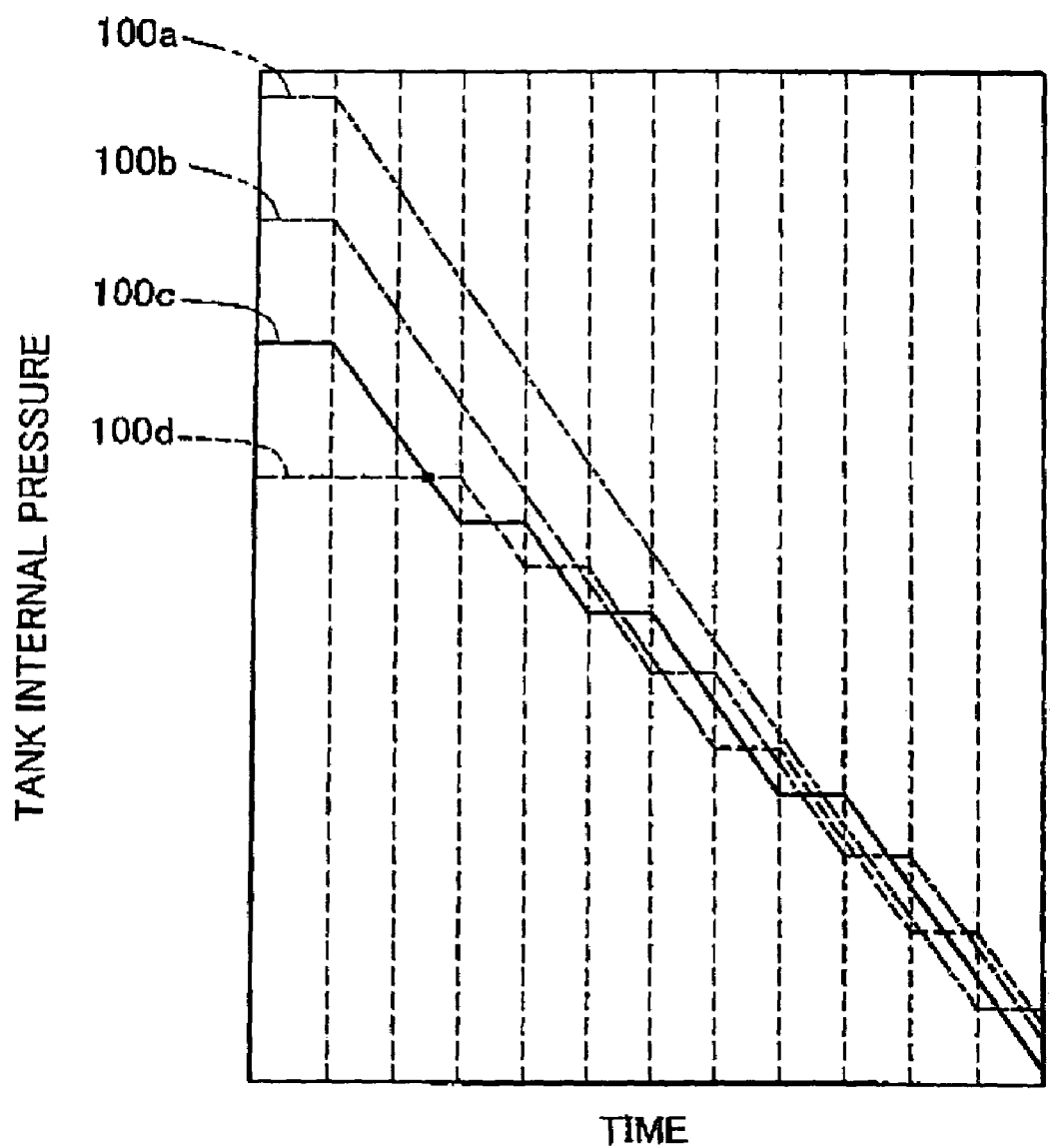
FIG. 7 is a graph showing time variations of internal pressure of the respective hydrogen tanks.

FIG. 7 is a graph showing time variations of internal pressure of the respective hydrogen tanks 100a, 100b, 100c, and 100d, while the above series of control processing is repeatedly executed. When the hydrogen tanks 100a, 100b, 100c, and 100d have the higher tank internal pressures in this order, the control procedure selects and activates the three hydrogen tanks 100a, 100b, and 100c to release equal volumes of hydrogen gas. With the progress of the release, the order of the higher tank internal pressure changes to 100a, 100b, 100d, and 100c. The control procedure then reselects three active hydrogen tanks to release the hydrogen gas from the three selected hydrogen tanks 100a, 100b, and 100d. The hydrogen tanks 100c and 100d of the lower internal pressures alternately repeat the release and the stop of the hydrogen gas until the internal pressures of the hydrogen tanks 100c and 100d reach the internal pressure of the hydrogen tank 100b. The hydrogen tanks 100c and 100d have the lower decrease speed of the internal pressure, compared with the hydrogen tanks 100a and 100b that constantly release the hydrogen gas. This gradually eliminates the difference in internal pressure among the respective hydrogen tanks 100a through 100d. When the internal pressures of the hydrogen tanks 100c and 100d reach the internal pressure of the hydrogen tank 100b, the three hydrogen tanks 100b, 100c, and 100d repeat the release and the stop of the hydrogen gas. The internal pressures of these three hydrogen tanks 100b, 100c, and 100d then gradually approach to the internal pressure of the hydrogen tank 100a. In this manner, the internal pressures of all the hydrogen tanks 100a, 100b, 100c, and 100d fall in a preset range. Selection of the active hydrogen tanks 100 for release of the hydrogen gas is carried out at preset time intervals. This effectively prevents hunting in the case where the hydrogen tanks 100c and 100d alternately release the hydrogen gas.

The control procedure of this embodiment ensures continuous release of the hydrogen gas without causing a significant variation in internal pressure among the respective hydrogen tanks 100a through 100d. This arrangement desirably prevents any preferential release from only one hydrogen tank 100 and its resulting abrupt temperature change.

The embodiments discussed above are to be considered in all aspects as illustrative and not restrictive. There may be many modifications, changes, and alterations without departing from the scope or spirit of the main characteristics of the present invention. For example, in the embodiments discussed above, the tank system has four high-pressure tanks. This tank system may, however, include two or any greater number of high-pressure tanks. In the first embodiment discussed above, the flow control is performed by the power-driven needle valve 110, which includes the motor 320 and the direct-acting actuation mechanism of the ball screw mechanism 340 and the linear guide 330. The flow control may be attained by combination of a poppet valve (shut valve) with this direct-acting actuation mechanism. In the embodiments discussed above, multiple tanks have an identical inner volume, and the control procedure aims at substantially equal consumptions of the hydrogen gas from the respective tanks. One possible modification may give weights to the release flow rates of the hydrogen gas from the respective tanks according to various conditions. For example, when preferential release of the hydrogen gas from a particular tank is desired or when multiple tanks have different dimensions, strengths, shapes, and other specifications, the release flow rates of the respective tanks may be set with the weights corresponding to the tank conditions (the inner volume, the temperature, and the surrounding environment).

Figure 8:
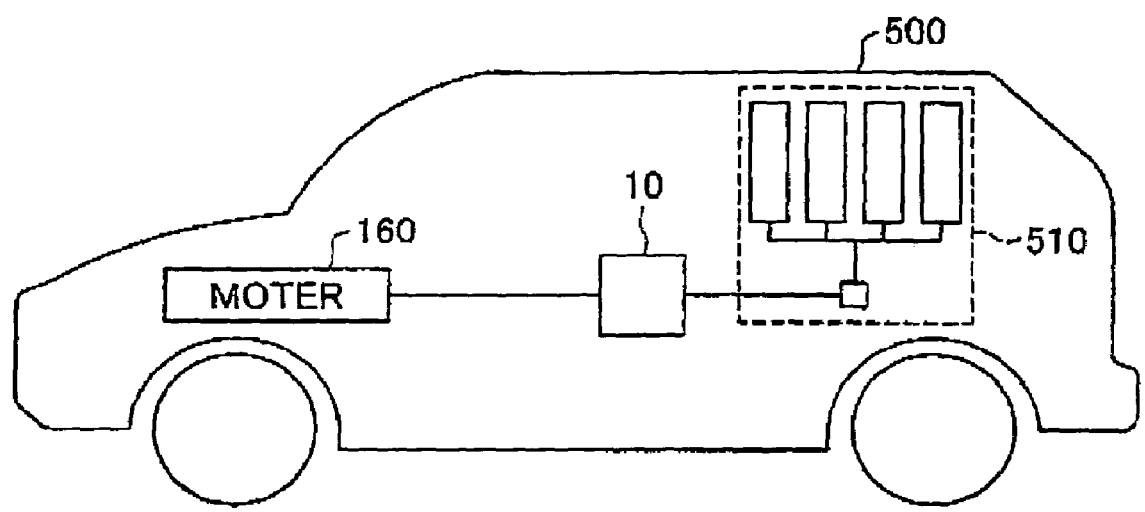
FIG. 8 shows a vehicle with the tank system storing and supplying hydrogen gas to a fuel cell system.

FIG. 8 shows a vehicle 500 with the tank system 510. The tank system described in the above mentioned embodiment stores hydrogen gas and supplies the gas to the fuel cell stack 10.

Figure 9:
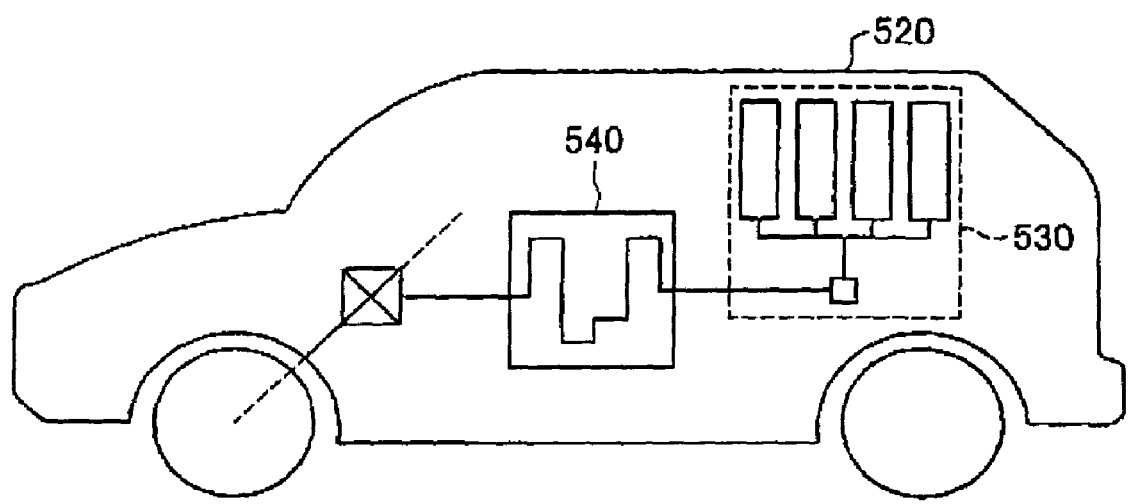
FIG. 9 shows a vehicle with the tank system storing and supplying natural gas to a combustion engine.

FIG. 9 also shows a vehicle 520 with the tank system 530. The tank system stores natural gas and supplies the gas to a combustion engine 540. The combustion engine 540 combusts the natural gas and outputs the energy to drive the vehicle 520.

All changes within the meaning and range of equivalency of the claims are intended to be embraced therein. The scope and spirit of the present invention are indicated by the appended claims, rather than by the foregoing description.

What is claimed is:

1. A tank system, comprising:
    multiple tanks;
    a conduit line that makes a joint flow of a fluid released from the multiple tanks and supplies the joint flow to a downstream device, which is located downstream of the multiple tanks;
    primary pressure measurement modules that individually measure internal pressures of the multiple tanks as primary pressures;
    flow rate regulation modules that individually regulate release flow rates of the fluid to be released from the multiple tanks; and
    a pressure control module that, for the joint flow with a supply flow rate, individually controls the release flow rate of the fluid to be released from each of the multiple tanks by monitoring current primary pressures that are continuously provided from the primary pressure measurement modules to the pressure control module.

2. A tank system in accordance with claim 1, wherein said pressure control module estimates a supply flow rate demand to be supplied to the downstream device from a measured secondary pressure of a secondary pressure measurement module, and then, for each of the multiple tanks, sets the allocation of the supply flow rate of the fluid to be released from the tank corresponding to the measured primary pressure with regard to the tank.

3. A tank system in accordance with claim 1, wherein said pressure control module excludes at least one tank of lower primary pressure and selects remaining tanks as tanks of higher primary pressure, based on the measured primary pressures with regard to the multiple tanks,
    said pressure control module giving an instruction of releasing the fluid at preset flow rates to said flow rate regulation modules corresponding to the tanks of higher primary pressure, and
    the selection of the tanks of higher primary pressure and the instruction are repeated at preset timings to successively change active tanks for the release of the fluid.

4. A tank system in accordance with claim 1, wherein said pressure control module sequentially sets a higher allocation of the supply flow rate to a tank of higher primary pressure among the multiple tanks according to the measured primary pressures with regard to the multiple tanks, and applies said flow rate regulation modules to release the fluid from the respective tanks at the settings of the allocations of the supply flow rate.

5. A tank system in accordance with claim 1, wherein each of said flow rate regulation modules is a solenoid valve that opens and closes a valve plug by means of electromagnetic force, and varies an open-close duty of the valve plug to regulate the release flow rate.

6. A tank system in accordance with claim 1, wherein each of said flow rate regulation modules is a needle valve that electrically moves back and forth a valve plug to adjust an opening sectional area, and varies an opening of the valve plug to regulate the release flow rate.

7. A tank system in accordance with claim 1, wherein each of said flow rate regulation modules is a motor-operated valve that comprises:
    a motor as a driving source of a valve plug;
    a ball screw mechanism including a screw formed on an output shaft of the motor, a nut formed inside the valve plug, and balls interposed between the screw and nut;
    a guide that holds the valve plug to be linearly movable back and forth in an axial direction; and
    a spring that presses the valve plug in the axial direction to set the valve plug in a closed position in a power-off state of the motor,
    said flow rate regulation module converting a rotational motion of the motor into a linear motion of the valve plug and moving the valve plug back and forth to open and close a release flow path from the tank and thereby regulate the release flow rate.

8. A tank system in accordance with claim 1, wherein, for each of the multiple tanks, said pressure control module measures a time variation of the primary pressure with regard to each tank, and sets the allocation of the supply flow rate of the fluid to be released from each tank, based on an inner volume of each tank and the measured variation of the primary pressure time.

9. A tank system in accordance with claim 1, said tank system further comprising:
    a flow rate measurement module that measures a release flow rate of the fluid released from each of the multiple tanks,
    wherein said pressure control module sets, for each of the multiple tanks, the allocation of the supply flow rate of the fluid to be released from each tank, based on the measured release flow rate.

10. A tank system in accordance with claim 1, wherein the multiple tanks are hydrogen tanks for storing hydrogen gas used for a fuel cell system mounted on a vehicle.

11. A tank system in accordance with claim 1, wherein the multiple tanks are compressed natural gas tanks for storing compressed natural gas used for an internal combustion engine system mounted on a vehicle.

12. A flow rate control method of a tank system having multiple tanks, said tank system making a joint flow of a fluid released from the multiple tanks and supplying the joint flow to a downstream device, which is located downstream of the multiple tanks, said flow rate control method comprising the steps of:
- individually measuring internal pressures of the multiple tanks as primary pressures; pressure;
- individually controlling, for the joint flow with a supply flow rate of the fluid to be released, the release flow rate by each of the multiple tanks; and
- individually regulating release flow rates of the fluid to be released from the multiple tanks by monitoring current primary pressures that are continuously provided from the primary pressure measurement modules to the pressure control module.

13. A flow rate control method in accordance with claim 12, wherein said controlling step estimates a supply flow rate demand to be supplied to the downstream device from a measured secondary pressure of the joint flow of the liquid, and then, for each of the multiple tanks, sets the allocation of the supply flow rate of the fluid to be released from the tank corresponding to the measured primary pressure with regard to that tank.

14. A flow rate control method in accordance with claim 12, wherein said allocation-setting step excludes at least one tank of lower primary pressure and selects remaining tanks as tanks of higher primary pressure, based on the measured primary pressures with regard to the multiple tanks,
- wherein said release flow rate regulating step executes release of the fluid at preset flow rates from the tanks of higher primary pressure, and
- wherein the selection of the tanks of higher primary pressure and the execution of the release of the fluid is repeated at preset timings to successively change active tanks for the release of the fluid.

15. A flow rate control method in accordance with claim 12, wherein said controlling step sequentially sets a higher allocation of the supply flow rate to a tank of higher primary pressure among the multiple tanks according to the measured primary pressures with regard to the multiple tanks, and
- said release flow rate regulating step executes release of the fluid from the respective tanks at the settings of the allocations of the supply flow rate.

16. A tank system that has multiple tanks containing a fluid and that supplies a flow of the fluid released from the multiple tanks to a device located downstream of the multiple tanks, the tank system comprising:
- primary pressure sensors that individually measure internal pressures of the multiple tanks as primary pressures;
- valves that are disposed between the multiple tanks and the device;
- a controller that refers to the measured primary pressures of the multiple tanks and regulates, at least, the flow of the fluid to be released from the valve that corresponds to the tank having the lowest primary pressure among the multiple tanks, and allows the flow of the fluid to be released from the valve that corresponds to the tank having the highest primary pressure, so as to control the supply flow rate to the device.

17. A tank system that has multiple tanks containing a fluid and that supplies a flow of the fluid released from the multiple tanks to a device located downstream of the multiple tanks, the tank system comprising:
- primary sensing means for individually measuring internal pressures of the multiple tanks as primary pressures;
- flow regulating means disposed between the multiple tanks and the device;
- control means for referring to the measured primary pressures of the multiple tanks and regulating, at least, the flow of the fluid to be released from the flow regulating means that corresponds to the tank having the lowest primary pressure among the multiple tanks, and allowing the flow of the fluid to be released from the flow regulating means that corresponds to the tank having the highest primary pressure, so as to control the supply flow rate to the device.

18. A tank system that has multiple tanks containing a fluid and that supplies a flow of the fluid released from the multiple tanks to a device located downstream of the multiple tanks, the tank system comprising;
- primary pressure sensors that individually measure internal pressures of the multiple tanks as primary pressures;
- valves that are disposed between the multiple tanks and the device; and
- a controller that specifies the tank having the lowest primary pressure based on the measured primary pressure of the multiple tanks and that regulates the flow of the fluid to be released from the valve that corresponds to the specified lowest primary pressure tank, and allows the flow of fluid to be released from the valve that corresponds to the tank having a higher primary pressure than that of the lowest primary pressure tank, so as to control the supply flow rate to the device.

19. A tank system that has multiple tanks containing a fluid and that supplies a flow of the fluid released from the multiple tanks to a device located downstream of the multiple tanks, the tank system comprising;
- primary sensing means for individually measuring internal pressures of the multiple tanks as primary pressures;
- flow regulating means disposed between the multiple tanks and the device; and
- control means for specifying the tank having the lowest primary pressure based on the measured primary pressure of the multiple tanks and for regulating the flow of the fluid to be released from the flow regulating means that corresponds to the tank having the lowest primary pressure among the multiple tanks, and for allowing the flow of fluid to be released from the flow regulating means that corresponds to the tank having a higher primary pressure than that of the lowest primary pressure tank, so as to control the supply flow rate to the device.

* * * * *